Dec. 6, 1932.  T. A. E. LAKE  1,890,059
FLYING MACHINE
Filed March 13, 1931   6 Sheets-Sheet 2
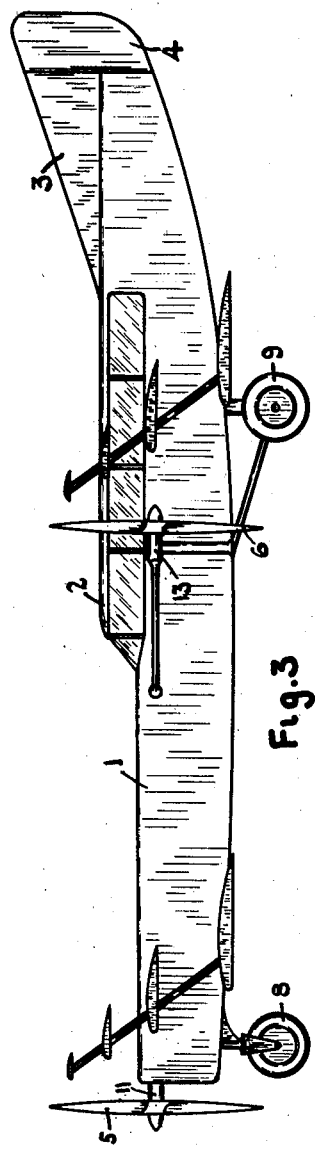
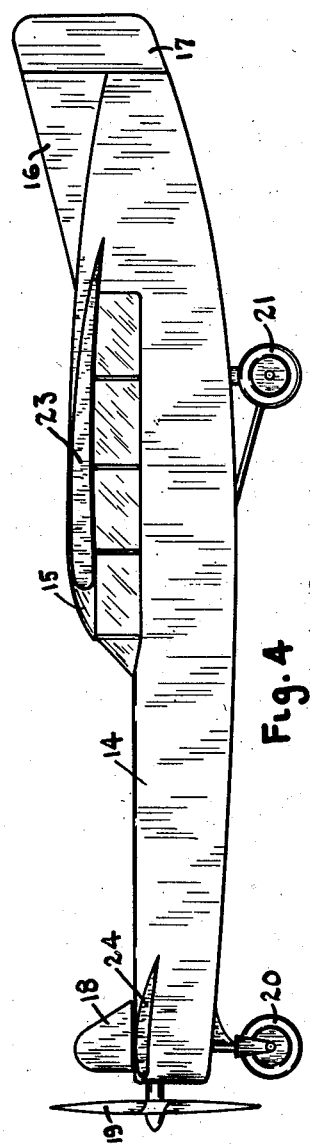
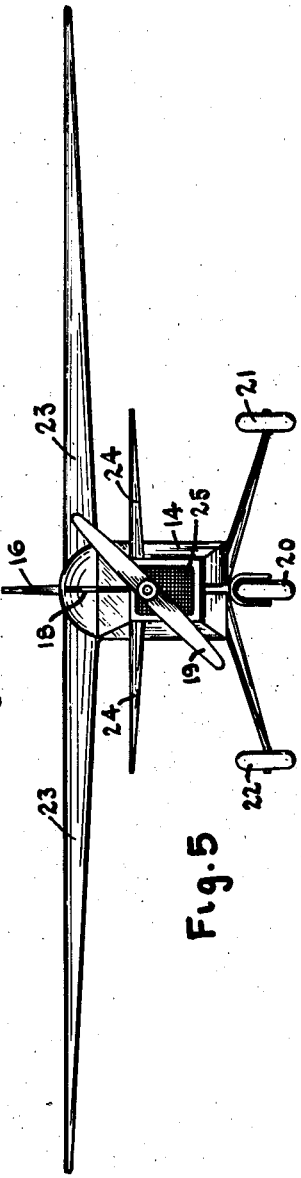
INVENTOR.
Thomas A. Edison Lake
Witnesses:

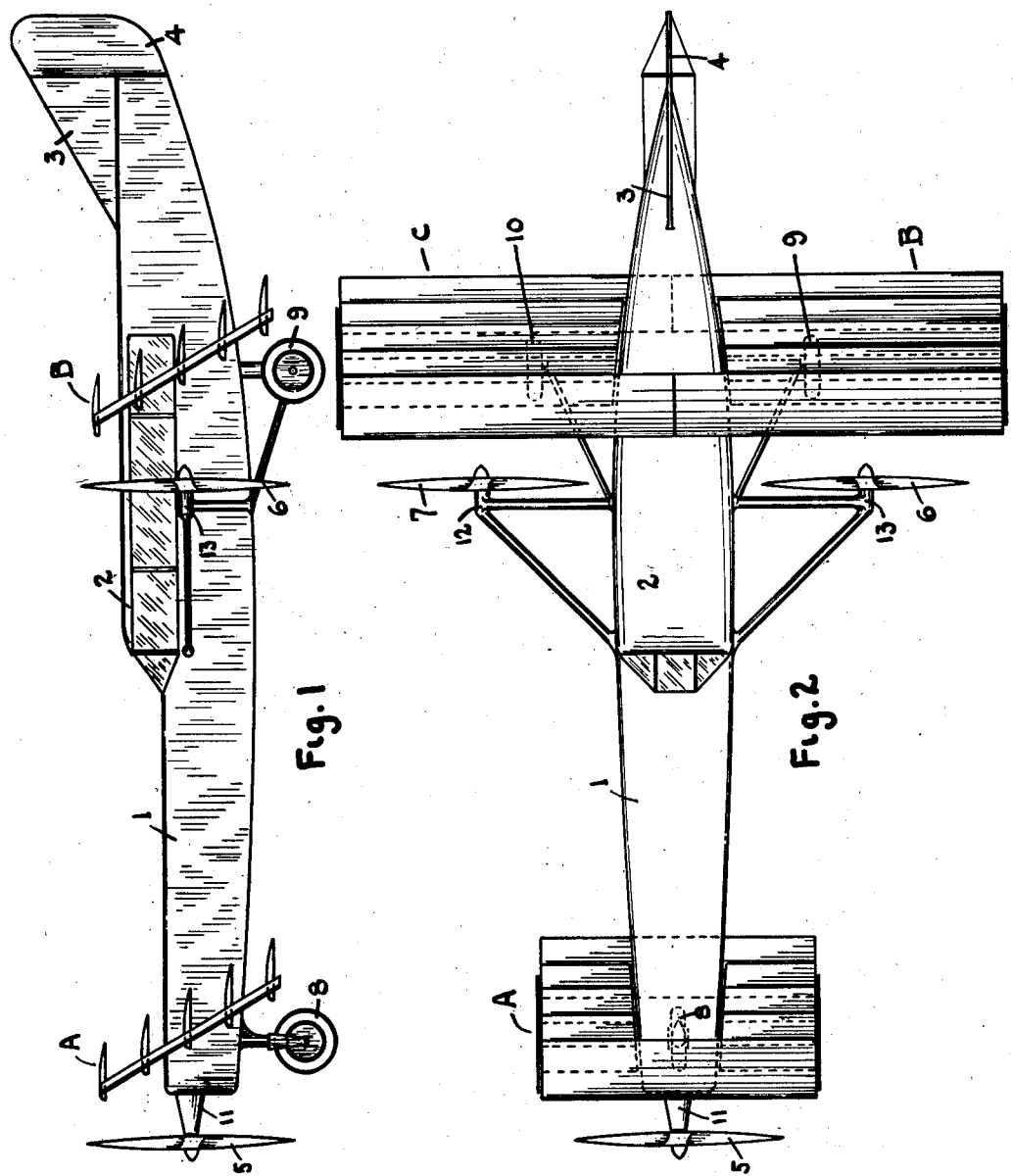

Dec. 6, 1932.   T. A. E. LAKE   1,890,059
FLYING MACHINE
Filed March 13, 1931   6 Sheets-Sheet 4

INVENTOR.
Thomas A. Edison Lake

Witnesses:
Bernard E. Charter
Cecil P. Ford

Dec. 6, 1932. T. A. E. LAKE 1,890,059
FLYING MACHINE
Filed March 13, 1931   6 Sheets-Sheet 5

INVENTOR.
Thomas A. Edison Lake

Witnesses:

Dec. 6, 1932.                 T. A. E. LAKE                  1,890,059
                             FLYING MACHINE
                     Filed March 13, 1931    6 Sheets-Sheet 6

INVENTOR.
Thomas A. Edison Lake

Witnesses:—
Bernard C. Charter
Cecil P. Ind

Patented Dec. 6, 1932

1,890,059

UNITED STATES PATENT OFFICE

THOMAS A. EDISON LAKE, OF MILFORD, CONNECTICUT

FLYING MACHINE

Application filed March 13, 1931. Serial No. 522,472.

The object of this invention is to provide a type of flying machine embodying certain features found in the present-day type of flying machines as well as being capable of the results sought with helicopters and other designs proposed for vertical ascent and vertical descent as well as for horizontal flight. In other words, a type of flying machine capable of vertical ascent, vertical descent, horizontal flight and any degree of ascent above the horizontal and any degree of descent below the horizontal.

A further object of this invention is to provide a type of airfoil or lifting surface capable of variable lift, and a combination or group arrangement of airfoils or lifting surfaces which may be adjusted for variable lift for horizontal flight as well as for vertical ascent and vertical descent.

A further object of this invention is to provide a combination arrangement of propellers and airfoils which may be adjusted for horizontal flight and any degree thereof, vertical ascent, vertical descent and maintaining fore and aft and lateral stability with or without headway while under the influence of the propellant force, as well as to maintain stability and be able to make a safe descent when the propellant force is inactive.

I attain these results, first, by providing airfoils or groups of airfoils which may be adjusted for variable lift, and secondly, by providing a combination of airfoils and propellers, which may be adjusted to provide vertical lift without headway, or lift and sustaining ability with headway.

I also provide an arrangement of airfoils or groups of airfoils (sustaining surfaces) which may be adjusted for the purpose of maintaining fore and aft stability and lateral stability while the flying machine is hovering, descending, ascending or in horizontal flight.

The invention consists in the peculiar and novel features of construction, combination and arrangement of parts as will be hereinafter fully described, explained and then claimed.

In the drawings, illustrating the invention, in the several figures of which like parts are similarly designated, Fig. 1 is a side elevation of a flying machine embodying some of the features of my invention. Fig. 2 is a plan view of Fig. 1. Fig. 3 is a design similar to Fig. 1, with flexible airfoils in place of those of Fig. 1. Fig. 4 is a side elevation of an airplane embodying some of the main features of my invention, including variable camber wings. Fig. 5 is a front elevation of Fig. 4. Fig. 6 is a side elevation of an airplane embodying the same features as the design shown in Figs. 4 and 5, but having twin propellers, and motors carried on the main wing with long drive-shafts extending to the propellers. Fig. 7 is a plan view of Fig. 6. Figs. 8, 9, 10, 11 and 12 are sections of variable camber wings or airfoils, which provide variable lift and directional control of the air flow. Figs. 13, 14, 15, 16, 17 and 18 are diagrammatic illustrations of the directional controlled flow of air to and from the airfoils or groups of airfoils embodied in my invention. Figs. 19, 20 and 21 show a combination group of airfoils or wings and propeller embodying the broad features of my invention. The airfoils or wings are shown as flat surfaces but they may be of any fixed section or variable as to camber and curvature. All of the figures and illustrations are more or less diagrammatic and are not intended to show details, but rather to illustrate the general application of my invention.

In Figs. 1, 2 and 3, 1 is a body or fuselage, provided with a cabin 2, a fin 3, a rudder 4, a forward propeller 5, two propellers 6 and 7 arranged on each side of the body, a motor (not shown) within the body 1 and operatively connected to the propellers 5, 6 and 7, a steering and shock-absorbing wheel 8, two shock-absorbing wheels 9 and 10 with supporting framework, a bearing 11 which supports the forward propeller 5, an arrangement of outriggers 12 and 13 with bearings and drive-shafts which support the propellers 6 and 7.

In Figs. 1 and 2, there are three groups of wings designated by the letters A, B and C. These groups of wings are operatively arranged to intercept the flow of air from the propellers and means will be provided whereby the pilot may make changes of adjustment during flight. Their purpose and means for operating same will be more fully explained hereinafter. In Fig. 3 are also three groups of wings and their purpose and means for operating same will be more fully explained hereinafter.

In Figs. 4 and 5, 14 is a body or fuselage, with a cabin 15, a fin 16, a rudder 17, a forward steering rudder 18, a propeller 19 connected to a motor (not shown) within the body 14, a steering and shock-absorbing wheel 20, rear shock-absorbing wheels 21 and 22, a main wing 23 extending on each side of the body 14, a forward wing 24 extending on each side of the body 14 and a radiator 25 in the front of the body 14. The construction and operation of the main wing 23 and the forward wing 24 will be more fully described and explained hereinafter.

In Figs. 6 and 7, 26 is a streamlined body or fuselage, having a fin 27, a vertical rudder 28, a windshield 29 and a seat 30. Attached to the body 26 are two wings 31 and 32. Supported by the wings are two motors enclosed in the housings 33 and 34. 35 and 36 are shock-absorbing wheels supporting the weight of the body and wings with the motors. Extending rigidly from the wings and motor supports are two hollow outriggers 37 and 38 which extend to the forward group of propellers and wing. Within each of these outriggers is a shaft 39. The shafts 39 operatively connect the propellers 40 and 41 with the motors which are supported by the main wings 31 and 32. Supported by the two outriggers 37 and 38 is a forward wing 42, vertical steering rudders 43 and combined landing wheel and steering rudders 44. As in the case of the other illustrations, the construction and operation of the forward wing and the two main wings will be more fully explained hereinafter. The position of the motors in Figs. 6 and 7 may be altered. They may be direct connected to the forward propellers and supported by the forward wing 42. In operation, the flying machine illustrated in Figs. 6 and 7 would function very much like a tug-boat towing a larger ship.

In Figs. 8, 9, 10, 11 and 12 are shown, in simplified detail, the construction of wing sections capable of variable camber and curvature. Such wings may be used independently or in combination with other features of my invention.

In Figs. 8 and 9 both the leading edge and the trailing edge of the wing may be adjusted. In Figs. 10 and 11 only the trailing edge portion of the wing is adjustable. In Fig. 12 a "means" for making such adjustment is illustrated. It may be applied to either the leading edge, the trailing edge or both. Other "operating means" may be used but that shown suffices for one illustration.

In Figs. 8 and 9, 45 and 46 represent transverse channels extending the full span of the wing, and are secured to the body or framework of an airplane. These channels may be replaced with any form of beam or cantilever construction. The illustrations are for the purpose of disclosing the mechanical action rather than the detail construction. The channels 45 and 46 are connected by channels 47, which, in combination with the wing covering, make the central portion of the wing rigid. 48 and 49 are additional transverse channels which are free to move up and down when the leading or trailing edges are so moved. Secured to the channels 45, 46, 47 and 48 are angle or bracket bearings 50. Attached to channel 48 is a fixed lever or spacer 51 which is also attached to the trailing edge member 52. Attached to the channel 49, is another fixed lever or spacer 53 which supports the leading edge member 54. The cross levers 55, by means of bolts or pins, operatively connect the channels 45 and 49. Likewise, the cross levers or links 56 operatively connect the channels 46 and 48.

In Figs. 10 and 11, the channels 45, 46 and 48, the fixed lever or spacer 51, the trailing edge member 52, the bearing brackets 50, the cross levers or links 56 and the leading edge member 54 are the same as in Figs. 8 and 9 except for relative dimensions. The portion of the wing forward of channel 45 is rigid, using a rigid member 57 in place of the cross levers 55 shown in Figs. 8 and 9. In place of the channel 47 in Figs. 8 and 9, a member 58 is used.

In Fig. 12, in addition to the parts shown in the Figs. 8, 9, 10 and 11, 59 is a bearing bracket, 60 is a sheave with an off-center hole and 61 is a shaft connected to operating means under control of the pilot. 62 is a metal tape secured to the sheave 60 by a screw 63. The ends of the metal tape 62 connect to the channel 48 by means of the pins or bolts in brackets 50, as shown. It will be understood that the transverse members 45, 46, 48, 49, 52 and 54 run the full width or span of the wings. As many cross links 55 and 56, bearing brackets 50, spacers 51 and 53, and members 47, 57 and 58 will be used as may be required for structural needs.

Various materials and methods of fastening may be used in the wing covering. Telescoping, sliding, flexible and fixed ribs may be used where required. For wing covering, flexible ply-wood may be used with or without flexible ribs where bending or change of curvature takes place. A sliding and overlapping of the wing coverings may take place as indicated. The actual movement or "stretch" takes place between the channels which are connected by the links 55 and 56. The wing covering between these members may be of an elastic material which would be under tension at all times. Such a material would do away with the sliding and overlapping of the wing surfaces previously referred to. In the case of the overlapping, covering, metal, wood or cloth with flexible ribs could be used, means for sliding contact may be provided to prevent the surfaces from actually separating.

The construction of transverse members (channels) and connecting cross links provide a simple and yet mechanically positive means for varying the curvature of a double surface airfoil. When the channels 48 and 49 are lowered (pulled or forced down) the leading and trailing edges descend even lower. This is due to the fact that as the channel 48 descends it also tilts, as shown in Fig. 9. In like manner can the section be curved upwards. The cross link movement can be applied to both the leading and trailing edge sections of the wing or applied to either one separately. It may be applied to all or only part of the full span of the wing. When applied to both the leading and trailing edge sections, both may be operated jointly or separately, as may be desired. The degree and limits of curvature desired will determine the relative dimensions of the various parts. As shown in Fig. 12, the sheave 60 must be off-center or eccentric. This is done to take up the slack and keep the tape 62 taut at all times.

Figs. 13, 14, 15, 16, 17 and 18 are diagrammatic illustrations of arrangements of airfoils, indicating their adjustment and the flow of air from propellers to and from the air foils, which is a basic feature of my invention. The various designs, arrangements and wing or airfoil details shown indicate means for applying this basic feature to all or part of the sustaining surfaces of a flying machine. In these diagrammatic illustrations, the double full lines represent the airfoils and the dot and dash lines with arrows indicate the flow of air to and from the airfoils. In Figs. 13, 15 and 17, the flow of air indicated may be due to the thrust from the propellers or due to the forward movement of the airfoils or the result of both conditions. For the adjustments indicated in Figs. 14, 16 and 18, the indicated flow of air is due to the thrust of the propellers and not horizontal movement of the airfoils, since the adjustments indicated are for direct vertical lift. The airfoils indicated in Figs. 13 and 14 are of the fixed camber or curvature type with means for progressively increasing the angles of incidence as indicated in Fig. 14. This progressive increase in angle of incidence begins with the upper airfoil. The adjustment shown in Fig. 14 provides maximum lift while at the same time offsetting forward motion, resulting in direct lift for vertical ascent.

The airfoils indicated in Figs. 15 and 16 are of the variable camber or curvature type. The chord of the airfoils in this group increase, beginning with the upper airfoil. The adjustment of these airfoils is such that the curvature of each one is progressively greater beginning with the upper and forward airfoil. Fig. 16 shows the adjustment for maximum lift without forward motion, providing vertical ascent.

Figures 19, 20:
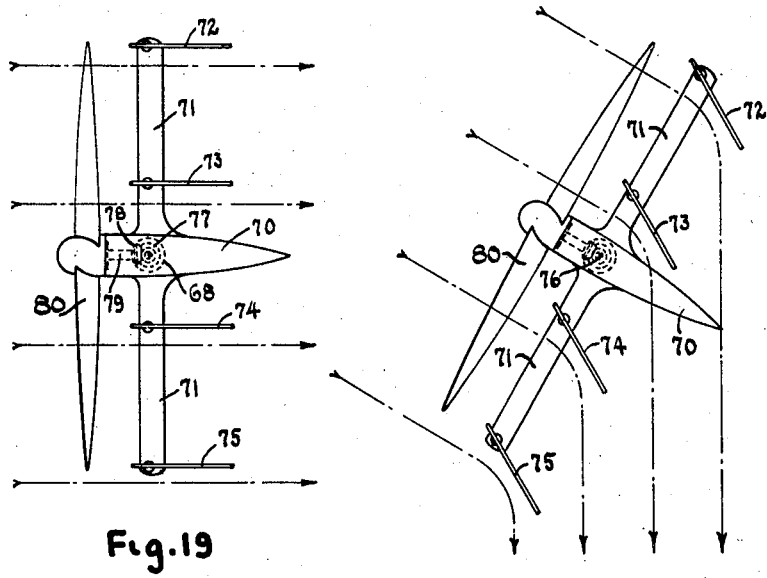
Figure 21:
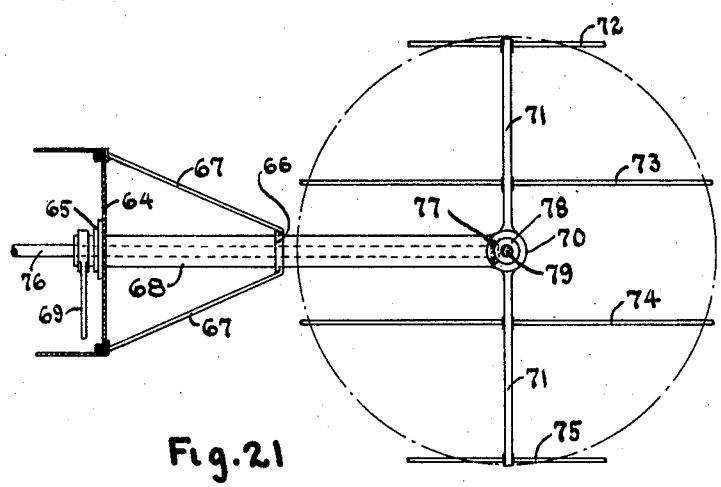

Figures 19, 20 and 21 illustrate a group arrangement of propeller and airfoils, which may be used in place wing groups and propellers shown in Figs. 1, 2 and 3. It will be noted that the propeller and wing group pivot or swing on a common axis, but the airfoils may be uniformly or progressively adjusted to different angles or degrees of curvature in relation to the line of thrust from the propeller and the base line (horizontal). The dot and dash lines with arrow heads indicate the flow of air from the propeller to and from the airfoils. As illustrated in these figures, the airfoils are shown flat but they may be of any fixed camber or curvature, or they may be of the variable curvature type.

In Figs. 19, 20 and 21, 64 represents a portion of the body or fuselage of an airplane. 65 is a flange bearing secured to the side of the body 64. 66 is a bearing support with four arms 67 which are secured to the side of the body 64. Rotatably supported by the flange bearing 65 and the bearing support 66, is a tube 68. Secured to one end of the tube 68, is a lever 69. Secured to the other end of the tube 68 is a housing 70 having vertical arms or struts 71. Mounted upon the struts 71 are airfoils 72, 73, 74 and 75. These airfoils may be of fixed curvature with means for varying their angles of incidence, or they may be flexible airfoils with means for varying their degree of curvature. Rotatably supported by the tube 68 and the housing 70 is a shaft 76, one end of which connects to the motor (not shown) and the other end is keyed to a bevel gear 77, which engages bevel gear 78 on the shaft 79 which operates the propeller 80. Means for rotating or tilting the entire propeller and airfoil group would be connected to the lever 69. Means for adjusting the airfoils would be brought through the tube 68 into the body and connected to suitable levers or control mechanism. Figs. 19 and 20 are side elevations and Fig. 21 is a front elevation with the propeller not shown but its rotating diameter is indicated by the dot and dash circle.

In all of the drawings, I have purposely left out bracing wires and other details in order to keep the illustrations more or less diagramatic and not complicated. It will be understood that such details would enter into the actual construction and operation devices although their illustration is not necessary to indicate the broad application of my invention.

In order to explain the main features of my invention, the construction and operation of the wings or airfoils, the arrangement and combination of parts, together with the results to be obtained, I will briefly state the main principles of flight as applied to practical flying so far accomplished.

With the exception of the ornithopter (a machine with flapping wings) there are two major types of heavier-than-air flying machines. One is the glider type, to which has been added a means for propulsion through the air. By being propelled through the air, this type of flying machine derives its support from the re-action of the air against its inclined or cambered wings. Discounting wind velocity, equal to that required of the airplane in horizontal flight, such a machine cannot hover or ascend vertically. In other words, it cannot sustain itself without horizontal headway.

The other major type is the helicopter which derives its support from the direct vertical thrust of its propellers. This type of machine attempts to build up a pressure beneath its propellers and thus sustain itself. Machines having rotating wings really belong in the same class as the powered glider. Instead of obtaining their support due to forward horizontal flight or motion, they obtain their support by causing the wings to travel in a closed circuit which is practically the equivalent to forward motion.

Now, since it is the movement of the airfoil through the air that provides "lift" for the powered-glider, and since it is equally true that the same airfoil, restrained as to horizontal motion, suspended in air moving at a velocity equal to the speed of the airfoil as first mentioned, would have the same lift value, then it is evident that the lift is due to the relative motion between the air and the airfoil irrespective of which is the moving body—the air or the airfoil. It is this result combined with the direct thrust feature of the helicopter that I apply to my type of flying machine.

To obtain vertical ascent, I cause a flow of air from the propellers to re-act upon the inclined or curved airfoils, producing a lift value similar to that produced by motion through the air, and the airfoils, in turn, deflect the air-flow downward giving the same effect as the direct vertical thrust from the propellers of a helicopter. Thus, a pressure and circulation of air is built up under the wings, providing greater lift than could be obtained by direct vertical thrust from propellers and also greater lift than can be obtained by driving the same wings through the air in the usual manner. I refer to this feature as "directional controlled air-flow".

By tests and experiments I find that the wings may be adjusted to offset the forward pull of the propellers while at the same time giving a maximum lift value for vertical ascent.

Figure 13:
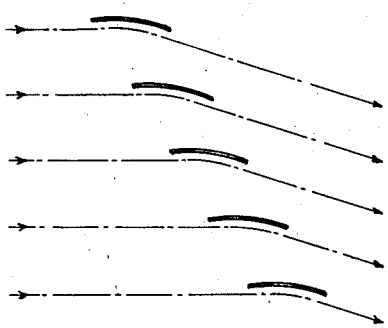

By again referring to Figs. 13, 14, 15 and 16, it will be noted that the airfoils are arranged in step-like order or staggered. In Fig. 13, the airfoils are adjusted for horizontal flight or making a gradual ascent in the usual manner. When set in this manner, the airfoils do not offset the forward pull of the propellers and the machine travels forward in the usual way, except that greater initial lift is obtained by reason of the airfoil area being within the slipstream from the propellers. Likewise, when maximum forward motion is attained, the airfoils give a greater lift value because of parasite resistance which results in a greater flow of air from the propellers than would be resulting from forward motion alone. The parasite resistance referred to is that other than the drag of the wings themselves.

Figure 14:
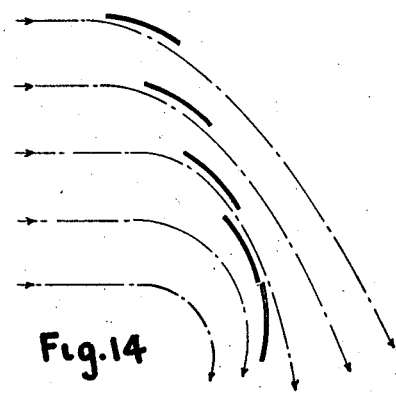

In Fig. 14, the airfoils are adjusted for direct vertical lift without forward motion. It will be noted that, beginning at the top, each airfoil assumes a progressively greater angle of incidence than the one preceding it. In effect, each preceding airfoil acts similar to a wing slot for the one following in the group. This progressive setting of the airfoils permits the last airfoil in the group to be set at an acute angle which not only produces a maximum lift for the entire group but also offsets the forward pull of the propellers. The arrangement also directs the flow of air downward producing an effect similar to the direct thrust of a helicopter's propellers. Since this downward flow of air tends to build up a pressure beneath the group of wings and also tends to circulate forward again, the air above the group becomes rarefied assisting in the direct lift. By test I have found that a slight variation from the extreme setting of the wings will permit the group to move forward very slowly, or a slight variation the other way will cause the group to move backwards, maintaining maximum lift value in either case. Rate of climb and forward motion is controlled by regulation of the adjustments between the minimum and maximum setting of the wings.

Figure 15:
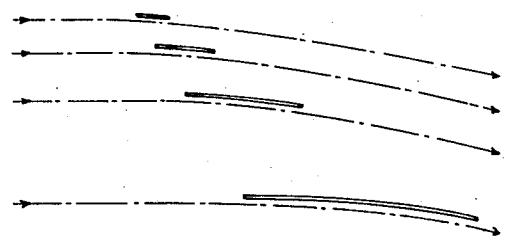
Figure 16:
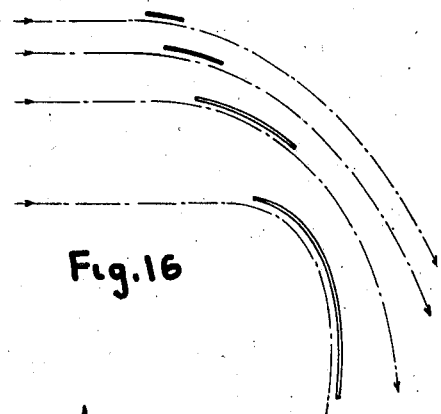

Figures 15 and 16, while indicating the use of variable camber or curvature wings in place of those indicated in Figs. 13 and 14, produce the same results and function in a manner that is common to both.

Figure 17:
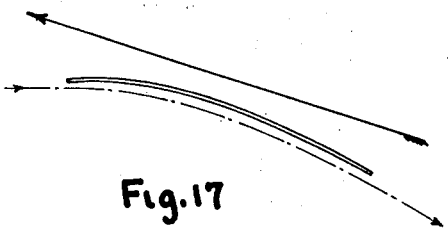
Fig. 17 illustrates a single airfoil travelling through the air and the arrow indicates the angle at which it will climb while moving forward.

Fig. 17 indicates a form of wing that is so common that no comment is necessary as to its action or qualities.

Figure 18:
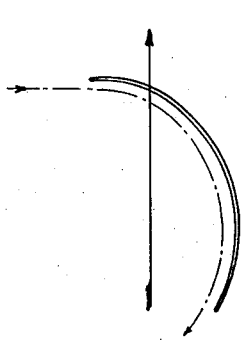
Figure 18 illustrates a single airfoil with the air caused to circulate to and beneath it, resulting in direct vertical lift, without headway, as indicated by the arrow.

Fig. 18 is purely diagrammatic and represents an exaggerated condition. However, to illustrate the theory of directional controlled air-flow, we might consider this figure as representing the sail of a sailboat running at right angles to the wind. We will assume that we are looking down on the main sail at a section about halfway above the boom where the sail bellies out as indicated. In spite of this acute setting, the boat moves forward in the direction indicated by the arrow. Now, assuming that this were the wing of an airplane with a propeller attached to it, the flow of air and the resistance to forward motion, as previously explained, would result in a movement at right angles to the thrust from the propeller—namely upwards, as indicated by the arrow.

From the foregoing, it will be understood that I provide an arrangement or group of wings that will give greater lift than a single airfoil of equal area. I also provide a group arrangement of wings and propellers which, in addition to providing support in horizontal flight, may also be adjusted to produce direct lift for vertical ascent. This broadly covers the action of the wings separately and in combination with propellers.

Figs. 1 and 2 illustrate the use of wing groups and propellers above referred to. In addition to this feature, it will be noted that the supporting area of the flying machine is divided into three groups, each group operating within the slip-stream or flow of air from the propeller in front of the group. This arrangement provides three-point support. The forward group is operated independently of the other two groups. The rear groups may be operated jointly or inversely. In other words, the two rear groups may be jointly adjusted to a desired setting. This would be accomplished with a mechanism having a single lever. These joint settings would be made by moving the lever forward or backward. Then by swinging the same lever to the right or left one group would be given a greater setting while the other would be given a lesser setting. Such adjustment would be made for lateral trim or balance and would be effective while the machine was in horizontal flight, when hovering and when making a vertical ascent or descent. In this connection it must be remembered that the wing groups are capable of variable lift with or without forward motion.

The forward group of wings being operated independently of the two rear groups makes it possible to maintain fore and aft trim, since this group too is capable of variable lift with or without forward motion.

Steering with vertical rudders can be accomplished with a foot-bar, in the usual manner. In Figs. 1, 2 and 3, the single vertical steering rudder is in the rear. In this position it would be effective in horizontal flight. If turning while hovering or while ascending or descending is desired, a vertical steering rudder may be placed forward so as to act within the slipstream from the forward propeller.

All of the general arrangements shown are of land machines but my invention applies also to water machines or amphibians. The operation of the machine shown in Fig. 3 would be the same as that shown in Figs. 1 and 2. The only difference is the substitution of variable curvature wings for those of fixed section.

Figures 6, 7:
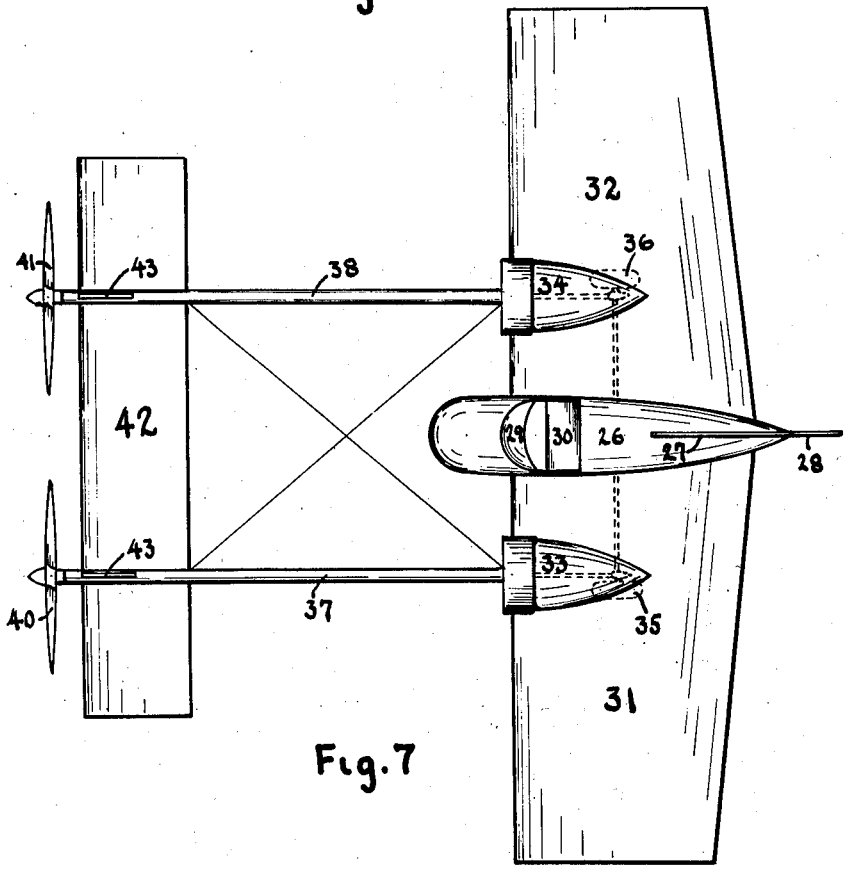
Figure 8:
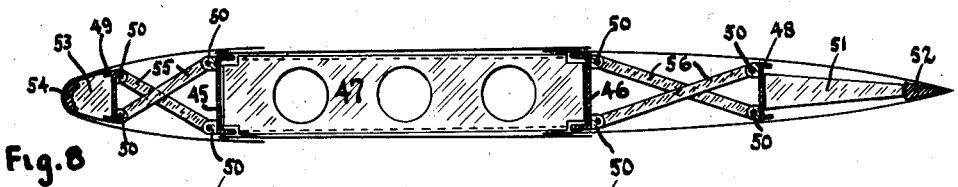
Figure 9:
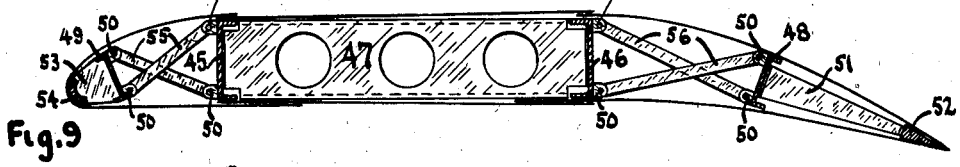
Figure 10:
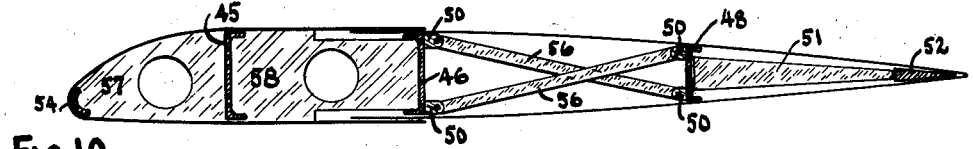
Figure 11:
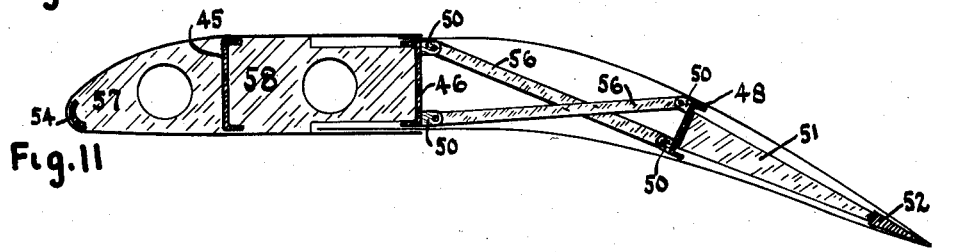
Figure 12:
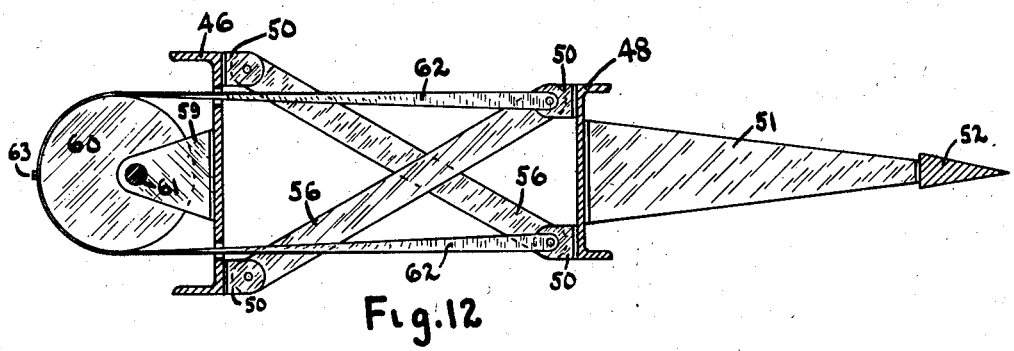

Figs. 4, 5, 6 and 7 are designs which embody the main features of my invention, but they are not capable of vertical ascent or the ability to "hover". Both of these designs may be called towing-planes. The forward wings with the propellers in front of them are like small powerful airplanes which tow larger airplanes behind them, very much like a tug-boat towing a big ship. The forward planes are capable of variable lift without or with headway, but the main wing must depend upon forward motion for support. The main wing and the forward wing are of the variable curvature type and may be either of the two types shown in Figs. 8 and 10. Although a wing of fixed curvature could be used for the front wing, with means for varying its angle of incidence, I do not believe it would be as effective as one capable of variable curvature.

The advantages of a wing capable of variable camber or curvature is well known and I will not dwell upon that part of my invention. The construction shown in Figs. 8, 9, 10, 11 and 12 show a practical design for such a type of wing. An earlier patent of mine fully explained and anticipated the advantages of flexible wings in which both the leading and trailing edges may be adjusted either jointly or separately.

Early types of aircraft had their control surfaces arranged in front of the main wing or wings but they did not have the propeller or propellers arranged forward of the control surfaces. It is this combination which I claim is new and the following are the advantages of such an arrangement.

By placing the smaller wing forward and arranging the propellers forward of said wing, greater control of fore and aft trim may be had while the airplane is acting under the influence of the propellers. By having all or the major portion of the forward wing so placed as to be within the slipstream of the propellers, the forward wing is capable of variable lift irrespective of the forward motion of the machine as a whole. This means that uniform and positive leverage is available at all times while the motor is running. It means that the airplane can "take off" at a greater angle of incidence and also land at a greater angle of incidence than is possible with the types of airplanes which have their control surfaces in the rear of the main wing. The arrangement also prevents blanketing of the control surfaces by the large main wing and stalling cannot occur as a result of such blanketing. It means that if the machine as a whole assumed an angle of incidence which normally would result in a stall, the forward wing could be forced down and the machine caused to assume a normal flying or gliding angle, counteracting or avoiding a stall. Only under such conditions would the forward wing exert a negative pressure. At all other times it would provide positive support. Such a machine could take off and land with less headway and ground run than the machines which have their control surfaces in the rear. Normally, all of the wing surfaces provide lift and carry the weight of the machine. The forward wing could be proportioned so as to carry more weight per square foot than the main wing due to the increased lift resulting from the slipstream of the propellers. This would mean that in the case of motor failure the machine would nose down and assume a safe gliding angle and not go into a stall. By being able to vary the lift value of both the forward and the main wing, the machine could ascend and descend on an even keel. In place of the forward wings shown in the Figs. 4, 5, 6 and 7, a group of wings such as shown in Fig. 1 could be used. All of the designs shown are capable of even keel ascent and descent, while in addition to this feature the arrangements shown in Figs. 1, 2, and 3 are capable of vertical ascent and vertical descent as well as the ability to hover.

Although I have shown and described the designs in Figs. 4, 5, 6 and 7 as having a main wing of variable curvature, I claim the right to use a main wing of fixed curvature with control surfaces arranged forward of the main wing and a propeller or propellers arranged forward of the control surface.

What I claim is:

1. A flying machine comprising three groups of wings and propellers arranged to provide three-point support, means for propulsion and means for adjusting the groups of wings and propellers jointly or separately to provide variable lift and stability.

2. A flying machine comprising a body, a motor or motors operatively connected to a forward propeller and a propeller arranged on each side of the body, a group of wings arranged behind the forward propeller, a group of wings arranged behind each of the side propellers, means for adjusting the three groups of wings simultaneously or independently and separately from one another.

3. A flying machine comprising a body, a motor operatively connected to a propeller in front of the body, horizontal and vertical steering rudders arranged behind the propeller, a main wing arranged behind the horizontal and vertical steering rudders and attached to the body, a fin and vertical steering rudder at the rear of the body, means for operating the horizontal and vertical steering rudders and means for varying the lift of the main wing.

4. A flying machine comprising a streamlined body with wings extending therefrom, motors supported by the wings, outriggers extending forward from the motors and wings, a combination wing and horizontal rudder secured to the forward ends of the outriggers, propellers arranged in front of the forward combination wing and horizontal rudder, shafts connecting the propellers with the motors, forward vertical steering rudders and a rear steering rudder.

5. A flying machine comprising a body or framework, one or more groups of wings or airfoils with a propeller or propellers arranged horizontally in front of said one or more groups of wings or airfoils, said wings or airfoils of each group arranged in steplike order and parallel to the central lines of thrust of said propeller or propellers, means for adjusting said wings or airfoils progressively beginning with the upper one and ending with the lower one so that each succeeding wing or airfoil will assume a greater angle or degree of curvature than the one preceding it, the maximum adjustment of which will provide maximum lift while simultaneously offsetting forward horizontal motion of the flying machine due to the pull of the propellers, thereby resulting in vertical lift without headway in a horizontal plane except by reverse adjustment of the wings from the maximum to the minimum or parallel setting or any degree of setting between the maximum and minimum adjustment.

6. A flying machine comprising three groups of wings with a propeller arranged in front of each group, the wings comprising each group being arranged in steplike order and capable of progressive adjustment beginning with the upper wing so that each succeeding wing will assume a greater angle than the wing preceding it, each group of wings capable of joint or independent adjustment for variable lift and for fore and aft as well as lateral trim, means for steering the flying machine about a vertical axis while in horizontal flight as well as when hovering, ascending or descending vertically.

7. A flying machine comprising three groups of wings, each group having a propeller arranged in front of it, a motor, motors or other source of power operatively connected to the propellers, steering means, means for jointly or independently adjusting each group of wings for variable lift in horizontal or vertical flight and for lateral as well as fore and aft trim, the wings in each group being arranged in steplike order and capable of progressive adjustment so that each succeeding wing will assume a greater angle or degree of curvature than the one above preceding it.

8. A flying machine comprising a plurality of wing groups and propellers, each wing group comprising a plurality of wings or airfoils arranged in steplike order behind a propeller and within the slipstream of said propeller, means whereby, beginning with the upper and forward wing of each group, each succeeding wing may be adjusted to assume a greater angle than the wing preceding it, means for jointly or independently adjusting each wing group to provide variable lift and for purposes of trim and stability, a source of power operatively connected to the propellers, means for steering the flying machine about a vertical axis when in horizontal flight as well as when hovering and when ascending or descending vertically and any degree thereof.

9. A flying machine comprising a plurality of groups of airfoils, each group of airfoils arranged to intercept the flow of air from a propeller situated in front of it, each group of airfoils arranged in steplike order and capable of adjustment whereby each air foil of the group will assume a greater angle or degree of curvature than the airfoil preceding it, means for jointly or independently adjusting each group of airfoils to provide variable lift for horizontal flight and any degree of ascent or descent between the horizontal and vertical as well as for trim and stability, means for steering with or without horizontal headway and means for operating and regulating the propellers.

10. A flying machine comprising three groups of wings arranged to provide three-point support, propelling and steering means, means for jointly or independently adjusting the groups of wings for variable lift and for trim and stability, means for adjusting the wings to offset the horizontal pull of the propelling means while at the same time providing maximum lift for vertical ascent or hovering.

11. A flying machine comprising one or more groups of wings, each group comprising two or more wings arranged in steplike order with the upper wing forward, the upper wing being of less chord than the wing or wings succeeding it and means for progressively increasing the angle or degree of curvature of each succeeding wing in the group arrangement, propelling means, stabilizing means and steering means.

12. A flying machine comprising one or more groups of wings, each group of wings comprising a plurality of wings arranged in steplike order with the upper wing forward, beginning with the upper wing in each group, each succeeding wing to have a greater chord than the wing preceding it, the wings of each group to be horizontally parallel with each other for minimum lift and means for progressively increasing the angle or curvature of each wing in the group beginning with the upper wing, to progressively increase the lift and to provide a maximum lift adjustment which will also offset the forward horizontal pull of the propellers and permit vertical ascent or vertical descent and hovering without horizontal headway.

13. A flying machine comprising a plurality of wing groups in combination with propellers arranged in front of each group, each group of wings proportioned so as to be within the slipstream of the propeller in front of it, each group of wings arranged in steplike order with the upper wing forward and each succeeding wing having a greater chord than the wing preceding it, means for progressively increasing the angle or degree of curvature of each wing beginning with the upper wing of each group, means for steering with or without horizontal headway and means for jointly or independently adjusting each group of wings.

14. A flying machine comprising a plurality of groups of wings with a propeller or propellers arranged in front of each group, the wings of each group to be arranged in steplike order, means for progressively increasing the angle or degree of curvature of each succeeding wing in each group, jointly or independently, means for steering with horizontal headway and means for rotating the flying machine about a vertical axis without horizontal headway.

15. A variable lift flying machine comprising a plurality of wing groups in combination with propellers, the wings of each group being arranged in steplike order and each succeeding wing in the group having a greater chord than the wing preceding it, means for adjusting each wing group independently or in combination, means for progressively increasing the angle or degree of curvature of each succeeding wing in each group and means for steering the flying machine about a vertical axis with or without horizontal headway.

In testimony whereof I have hereunto set my hand this 5th day of March, 1931.

THOMAS A. EDISON LAKE.